Nov. 28, 1961  F. PERRUCA  3,010,330
FRICTION TYPE CHANGE SPEED GEARS
Filed Jan. 28, 1959  4 Sheets-Sheet 2

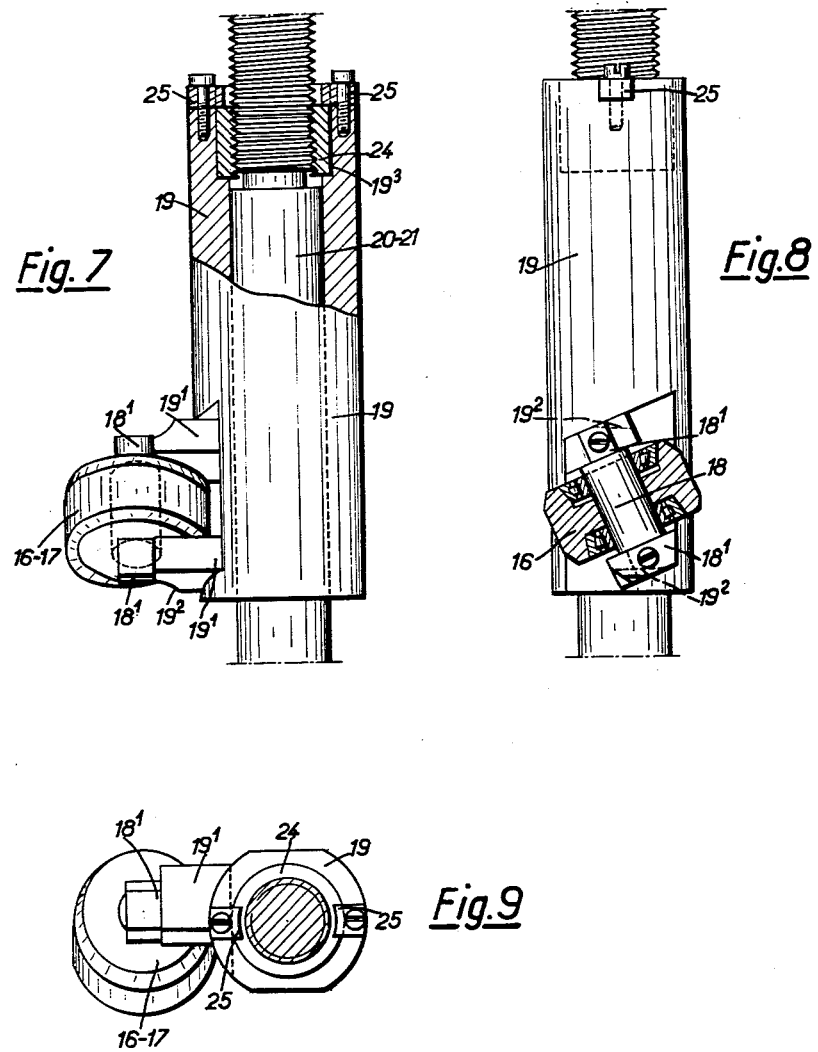

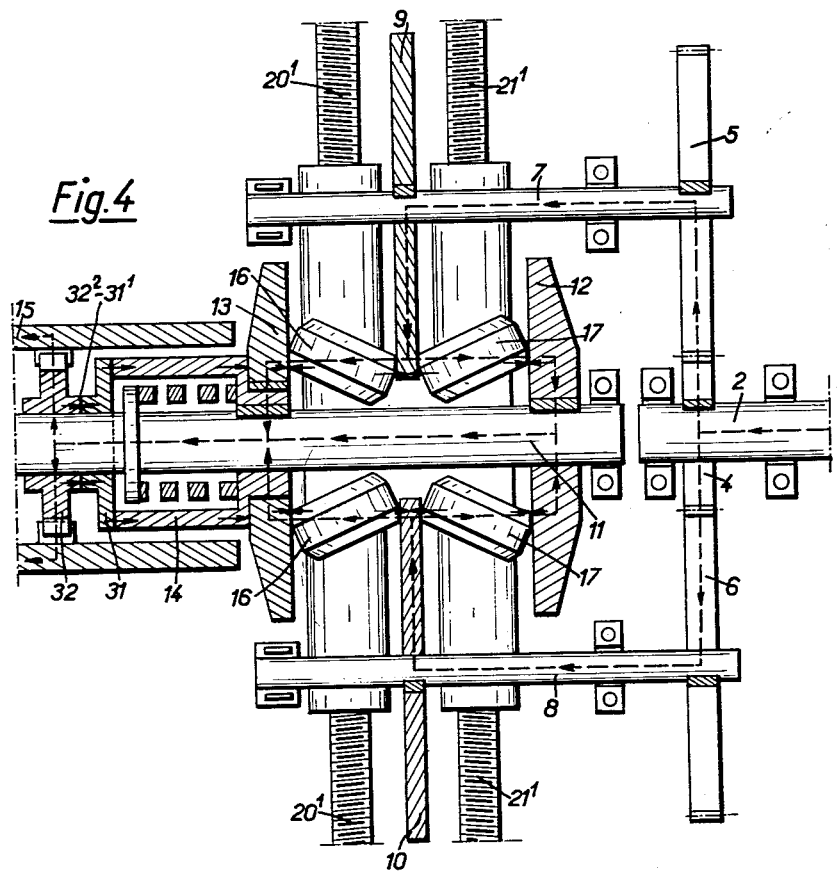
*Fig.4*
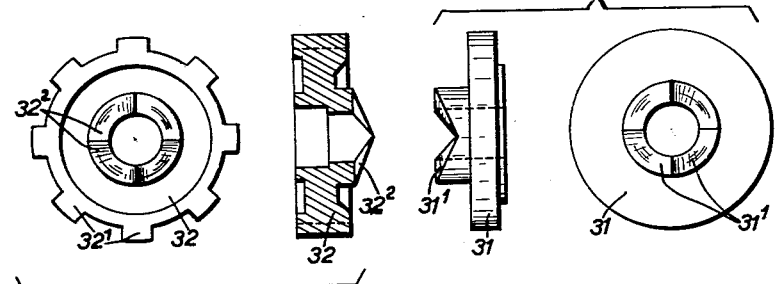
*Fig.6*
*Fig.5*

United States Patent Office

3,010,330
Patented Nov. 28, 1961

3,010,330
FRICTION TYPE CHANGE SPEED GEARS
Felix Perruca, Saint-Etienne, Loire, France, assignor to Societe des Fabrications Unicum (societe a responsabilite limitee), Saint-Etienne, Loire, France, a French company
Filed Jan. 28, 1959, Ser. No. 789,539
Claims priority, application France Feb. 19, 1958
5 Claims. (Cl. 74—200)

This invention relates to friction type change speed gears.

An essential condition for correct functioning of such gears is that frictional contact between the frictional contact members should be substantially perfect. A very slight amount of slip between these members tends to damage contact surfaces thereof.

Although frictional contact members can be composed of materials which have high coefficients of friction, the wear on these members is in this case very rapid.

An advantageously adopted solution consists in forming the frictional contact members of metal, and more particularly of steel which has been suitably hardened by appropriate alloying. These members are very strong, the efficiency of the frictional contact depending solely on the pressure or pressures which are applied to the friction members. Apparatus have already been proposed which automatically effect, between the friction members, a pressure which is proportional to the resistant torque of the output shaft.

The use of very high pressure is not without disadvantages. Such pressures not only contribute to the provision of very good frictional contact, but cause considerable unbalanced forces to occur, which forces tend to buckle the friction wheels and to strain the spindles or shafts carrying the wheels. This complicates the construction of change-speed gears and limits the power which such gears are capable of transmitting.

It is an object of the invention to provide a friction type change speed gear having two transmission shafts, in which gear the pressures obtaining when the gear is in operation are evenly balanced against one another.

It is a further object of the invention to provide such a gear in which owing to the aforementioned balancing of said pressures, the resultant pressures obtaining when the gear is operating are directed axially of a single shaft, whereby the casing of the gear can be of substantially light construction.

It is a further object of the invention to provide such a gear in which the driving forces employed can be of substantially double the value of those that are employed in conventional friction type change speed gears.

It is a further object of the invention to provide such a gear, in which slip between the frictional contact members is substantially eliminated.

It is a further object of the invention to provide such a gear which is of substantially simple and economical construction.

According to the present invention there is provided a friction type change speed gear, comprising a driving shaft, a secondary shaft, a plurality of transmission shafts off-set from alignment with said driving shaft and connected thereto in driven relationship, a driving wheel on each transmission shaft, a driven wheel, an abutment wheel, friction rollers connecting one face of each driving wheel to said driven wheel in driving relationship and the other face of each driving wheel to said abutment wheel in driving relationship and means for exerting pressure against the driven wheel in the axial direction thereof for compensating for variations in the resistance torque of the secondary shaft.

With these and other objects in view the invention resides in the novel features of construction and combinations and arrangements of parts as more fully hereinafter set forth.

In the drawings:

FIGURE 4 is a diagrammatic sectional side elevational view of the change speed gear shown in FIGURES 1 and 2;

Figure 3:
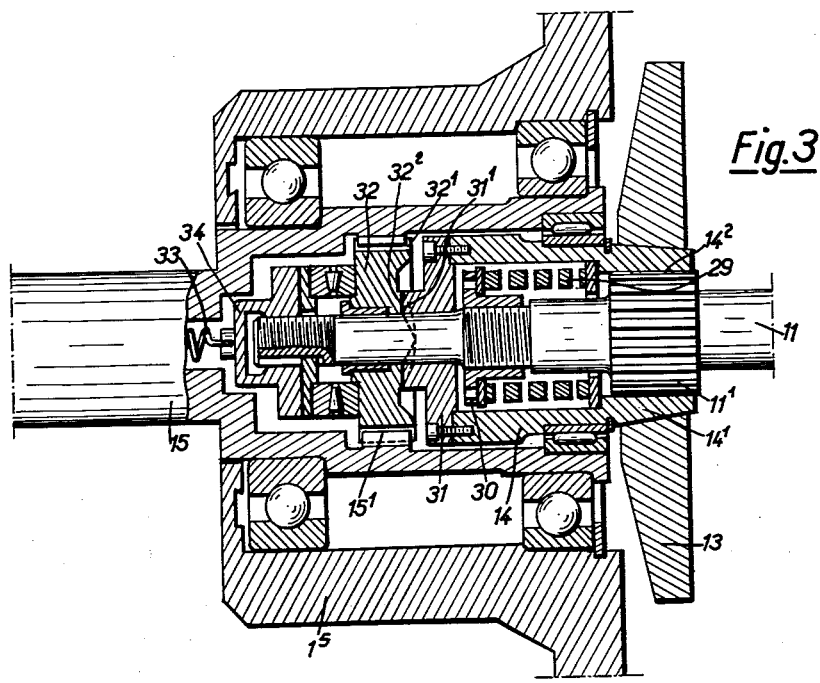
FIGURE 3 is an axial view, partly in section of a pressure device for a friction type change speed gear, for use with the change speed gear shown in FIGURES 1 and 2.

FIGURES 5 and 6, each shows a front elevation view and a side elevational view in section of a detail of the device shown in FIGURE 3;

FIGURES 7 and 8, each is an elevational view, partly in section of part of a friction-type change speed gear according to the invention;

FIGURE 9 is a perspective view of a detail of the parts shown in FIGURES 7 and 8.

Figure 1:
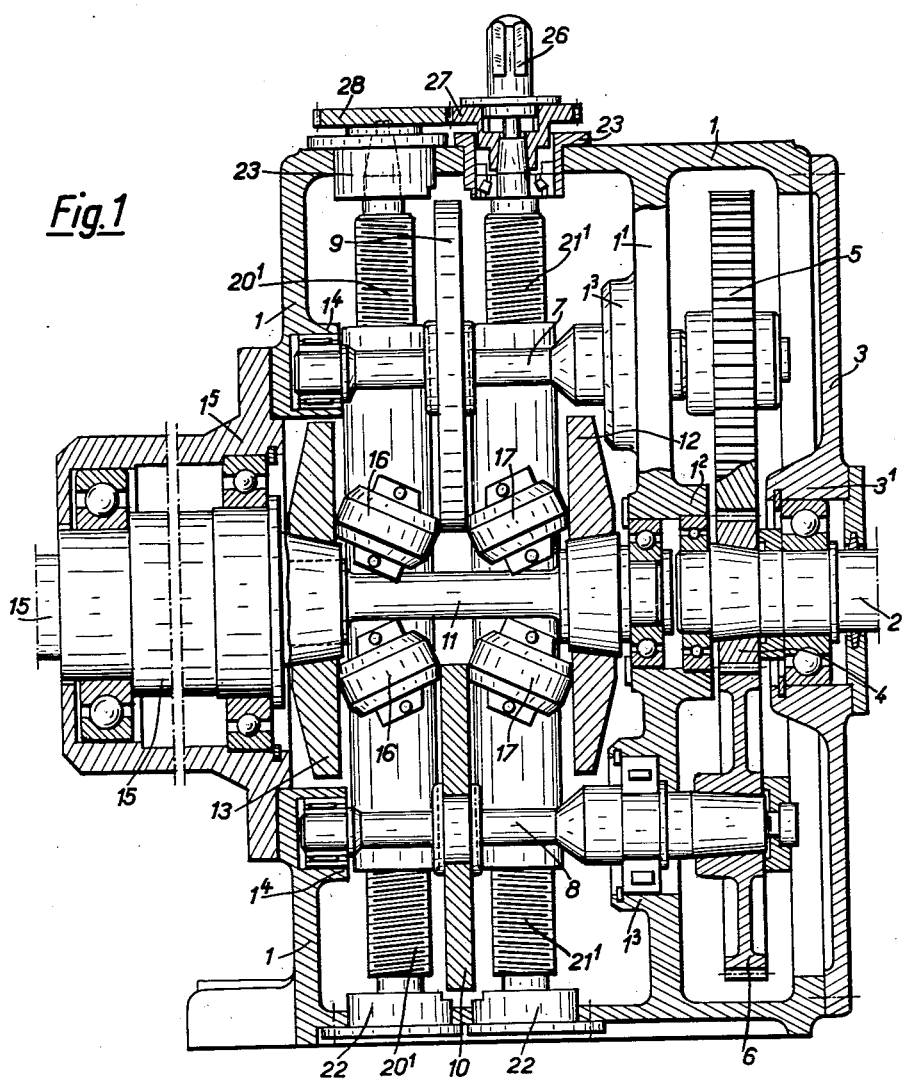
FIGURE 1 is a side elevational view, partly in section of a friction type change speed gear according to the invention.
Figure 2:
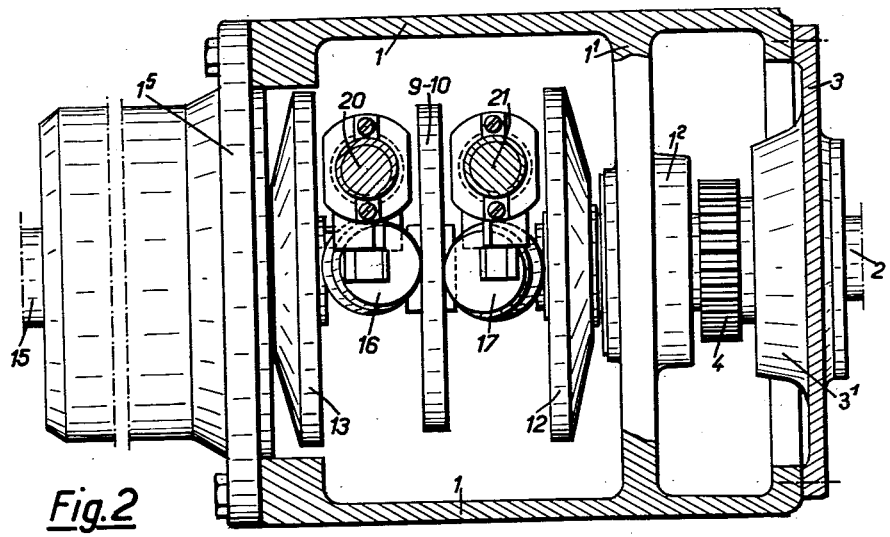
FIGURE 2 is a plan view, partly in section of the change speed gear shown in FIGURE 1.

Reference will now be made to FIGURES 1 and 2 of the accompanying drawings. A frame 1 which may in the interests of economy be of substantially small wall thickness, since as will be hereinafter described, the pressures obtaining when the change speed gear is in operation are arranged to be taken up by an intermediate shaft 11, is shown in axial section. A primary shaft 2 to which a driving torque is arranged to be applied, is rotatably mounted in ball bearings carried by a bearing element $1^2$ arranged in an inner wall $1^1$ of the frame 1, and by a bearing element $3^1$ carried by a closure plate 3 attached to the frame 1 so as to close the open end thereof.

A gear wheel 4 is keyed to the primary shaft 2 and is arranged to mesh with two substantially identical gear wheels 5 and 6, which gear wheels are keyed respectively to shafts 7 and 8. The shafts 7 and 8 are rotatable in antifriction bearings arranged in bearing elements $1^3$ in the wall $1^1$, and bearing elements $1^4$ in the frame 1. Identical driving friction wheels 9 and 10 are mounted respectively on the shafts 7 and 8. The shaft 11 is mounted at one end thereof so as to be rotatable in the bearing element $1^2$ in an antifriction bearing, the other end of the shaft 11 being connected to a pressure device rotatably connecting the shaft 11 with an output shaft 15, carried by a support $1^5$ fixed to the frame 1. The axial position of the shaft 11 is fixed by the antifriction bearing of the bearing element $1^2$.

An abutment wheel 12 is keyed to the shaft 11 for rotation therewith and frictionally engages friction rollers 17. A driven friction wheel 13 is fixed relative to the shaft 11 for rotation therewith. The driven wheel 13 is keyed to a conical element $14^1$ fixedly mounted on a sleeve 14 on the shaft 11. The sleeve 14 is normally rotatable with the output shaft 15 via the said pressure device, which device is arranged to provide a pressure which is automatically proportional to the torque to be transmitted. Splined bearing surfaces $11^1$ and $14^2$ (FIG. 3) connect the shaft 11 and the sleeve 14 for rotation with one another. The friction rollers 16 kinematically connect the driving wheels 9 and 10 to the driven wheel 13. The friction rollers 17 kinematically connect the abutment wheel 12 to the driving wheels 9 and 10, and balance the pressures exerted by the driving wheels 9 and 10 in the direction of the abutment wheel 12. The rollers 16 and 17 which are identical with one another have conical bearing surfaces $16^1$ and $17^1$ respectively.

The bearing surfaces $16^1$ are arranged to bear against the driven wheel 13 and the wheels 9 and 10, and the bearing surfaces 17¹ are arranged to bear against the wheels 9 and 10 and the wheel 12 at an angle as shown in the drawings, so as to eliminate the effects of relative differences in speed over the width of the bearing surfaces 16¹, 17¹.

Each roller 16 and 17 is mounted so as to be freely rotatable in anti-friction bearings on a pin 18 (FIG. 8). Each pin 18 has flattened ends 18¹ (FIGS. 7, 8 and 9), which ends are fixed for example by means of screws to lugs 19¹ on a supporting sleeve 19. The lugs 19¹ are recessed at 19² to permit maximum displacement radially of the friction wheels with which the rollers are in contact without the lugs bearing against either of the shafts 7, 8 or 11.

The sleeves 19 (see FIG. 7) are slidably mounted on, so as to be guided by, regulating shafts 20, 21, which shafts are rotatably mounted in anti-friction bearings and ball type thrust bearings, in bearing elements 22 and 23 (FIG. 1) carried respectively in the bottom and top portions of the frame 1. The shafts 20 and 21 are provided towards the ends thereof with threaded portions 20¹ and 21¹. The threads of the threaded portions of each shaft 20, 21 are of the same pitch, but are directed in opposite senses to one another. The shafts 20 and 21 are so arranged that the threads of adjacent portions 20¹ and 21¹ are oppositely directed. Threaded nuts 24 are disposed in recesses 19³ in the sleeves 19 and are arranged to cooperate with the threaded portions 20¹ and 21¹ so that the sleeves 19 can be displaced on the shafts 20, 21, whereby displacing the rollers 16, 17 radially of the wheels 9, 10; 12 and 13.

The nuts are held against rotation by means of keys 25 fitted in radial slots formed in the ends of the sleeves 19, and in the nuts 24. A square nut or driving head 26 for rotating the threaded portions 20¹ and 21¹ in the sleeves 19 so as to displace the sleeves and rollers radially of the wheels 9, 10; and 12, 13, is arranged to actuate a pinion 27 fixedly attached to the shaft 21. A pinion 28 meshing with pinion 27 is fixedly mounted on the shaft 20 so that the shafts 20 and 21 can be rotated simultaneously and in opposite directions by rotating the driving head 26. Since the adjacent threaded portions 20¹ and 21¹ have oppositely directed threads the rollers 16 and 17 are displaced over an equal distance and in the same direction radially of the shaft 11. The positions of the rollers 16, 17 should be initially regulated so that the rollers are arranged at equal distances from the axis of the shaft 11. Such regulation should be effected before mounting the keys 25 and the pinions 27 and 28. The considerable pressure necessary to ensure the required friction between the rollers and the wheels 9, 10; and 12, 13, can be obtained by employing known arrangements.

Such a device is shown in FIGURE 3. Resilient means comprising a helical spring 29 of substantially square cross section is arranged to apply a continuous pressure against the driven wheel 13. One end of the spring bears against a shoulder in the bore of the sleeve 14, the other end of the spring bearing against a ring 30 which is fixedly attached to the shaft 11. In order to obtain a working pressure between the rollers 16, 17 and the wheels 9, 10; and 12, 13, which are in frictional contact with said rollers, which pressure is directly proportional to variations obtaining during operation of the gear in the resistance torque of the output shaft 15, a pressure member 31 (FIG. 6) fixed to the sleeve 14 is provided, there being a second pressure member (FIG. 5) which is keyed in a bore of the output shaft 15 and is rotatable with said shaft. The members 31 and 32 are provided with inclined surfaces 31¹ and 32², which surfaces are adapted to engage one another so that the shaft 11 can drive the shaft 15. The said inclined surfaces of the pressure members comprise ramps 31¹, 32² (FIGS. 5 and 6) which are in plan view arc shaped and are arranged in similar pairs, the ramps of each pair being similar and opposed, all the ramps of each member cooperating to form a circular collar coaxial with the axis of rotation of the member. The ramps have steep slopes and present engagement surfaces of large area, each ramp being equivalent to a fraction of the pitch of a screw thread of square cross section and coarse pitch. As a result of differences in value between the driving torque and the resistance torque, the members 31 and 32 are displaced angularly with respect to one another during operation of the change speed gear. This angular displacement is converted into a substantial axial pressure due to cooperation between inclination of the surfaces of the ramps of one member with those of the other member. The continuous pressure of the spring 29 is additive to the said axial pressure. The required working pressure for urging the rollers against the wheels 9, 10; and 12, 13 is thus obtained at all working speeds. The speeds obtained at the output shaft can be ascertained by means of an indicator (not shown) having indicating means displaceable in accordance with the displacement of the rollers 16 and 17 radially of the axis of the shaft 11.

In order to take up play which may occur between the pressure members, a helical spring 33 (FIG. 3) is arranged so as to have high circular tension in the output shaft 15. The other end of the spring is fixedly attached to a nut 34 screwed to the threaded end 34 of the shaft 11, so that the nut is rotatable on the thread. The nut bears against the pressure member 32 via an antifriction bearing 35, and thus applies pressure to the whole system of pressure members, rollers and wheels. If even a small amount of play occurs, the nut 34 is caused by the spring 33 to advance along the threaded end of the shaft 11 so as to take up the play.

Reference will now be made to FIGURE 4 of the accompanying drawings. The manner in which the driving torque of the primary shaft 2 is applied to the plates 9 and 10 will now be considered. In FIGURE 4 the main forces obtaining when the change speed gear is in operation are indicated by arrows. It will be apparent from the figure that the forces and pressures obtaining at the wheels and rollers act finally substantially only on the shaft 11, since the wheels 12 and 13 are fixedly mounted on the shaft 11, the shaft being driven by traction. The above described change speed gear may be modified in various ways within the scope of the invention.

What I claim as my invention is:

1. A gear device comprising a rotatable driving shaft, transmission shafts parallel to and radially spaced from said driving shaft, gear wheels coupling the driving shaft to the transmission shafts for driving the latter, friction wheels on and driven by the transmission shafts, an intermediate shaft coaxial with said driving shaft, an abutment wheel fixed on and rotatable with said intermediate shaft, a driven wheel axially displaceable on but rotatable with said intermediate shaft, said abutment and driven wheels being spaced and accommodating therebetween said friction wheels in spaced relation thereto, friction rollers between said friction wheels and said abutment and driven wheels and defining axes oblique to said wheels, said rollers having frustoconical surfaces engaging said wheels, an output shaft coaxial with said intermediate shaft, pressure members on said intermediate and output shafts and in axially abutting relation and play take-up means engaging the pressure members to take-up play therebetween and provide a yieldable driving relationship between said intermediate and output shafts, said pressure members including and being provided with ramps and accommodating grooves and being axially separable upon relative angular displacement, said driven wheel being coupled to one of said pressure members for axial displacement therewith and for driving the same, an axial displacement of said driven wheel varying the transmission of torque from the friction wheels to said driven wheel.

2. A device as claimed in claim 1 comprising means supporting the friction rollers for simultaneous adjustment in like radial directions relative to the intermediate shaft.

3. A device as claimed in claim 1 wherein the other of the pressure members is keyed with said output shaft.

4. A device as claimed in claim 1 wherein said ramps are threads of square section and of less than one pitch.

5. A device as claimed in claim 1 comprising means for positionally adjusting said friction rollers both separately and simultaneously.

References Cited in the file of this patent

UNITED STATES PATENTS

| 1,544,697 | Stoeckicht | July 7, 1925 |
| 2,835,134 | Perruca | May 20, 1958 |

FOREIGN PATENTS

| 630,550 | France | Aug. 23, 1927 |
| 255,798 | Switzerland | July 15, 1948 |
| 650,166 | Great Britain | Feb. 14, 1951 |